United States Patent [19]

Childs et al.

[11] Patent Number: 4,676,832
[45] Date of Patent: Jun. 30, 1987

[54] SET DELAYED CEMENT COMPOSITIONS AND METHODS OF USING THE SAME

[75] Inventors: Jerry D. Childs; David L. Sutton; Freddie L. Sabins, all of Duncan, Okla.

[73] Assignee: Halliburton Company, Duncan, Okla.

[21] Appl. No.: 665,248

[22] Filed: Oct. 26, 1984

[51] Int. Cl.$^4$ .............................................. C04B 7/35
[52] U.S. Cl. ......................................... 106/90; 106/314; 106/315; 166/293
[58] Field of Search ......................... 106/315, 314, 90; 166/293

[56] References Cited

U.S. PATENT DOCUMENTS

| | | | |
|---|---|---|---|
| 3,465,825 | 9/1969 | Hook et al. | 166/293 |
| 3,619,221 | 11/1971 | Kossivas | 106/90 |
| 3,686,008 | 8/1972 | Harrison et al. | 106/92 |
| 3,770,815 | 11/1973 | Jones | 260/501.12 |
| 3,964,921 | 6/1976 | Persinski et al. | 106/90 |
| 4,040,854 | 8/1977 | Persinski et al. | 106/90 |
| 4,340,525 | 7/1982 | Hubner et al. | 252/8.55 |
| 4,373,956 | 2/1983 | Rosskopf | 106/90 |
| 4,466,835 | 8/1984 | Crump et al. | 106/90 |
| 4,468,252 | 8/1984 | Crump et al. | 106/90 |
| 4,472,200 | 9/1984 | Crump et al. | 106/90 |

FOREIGN PATENT DOCUMENTS

| | | |
|---|---|---|
| 2037586 | 2/1972 | Fed. Rep. of Germany . |
| 1376001 | 2/1965 | France . |

*Primary Examiner*—William R. Dixon, Jr.
*Assistant Examiner*—A. Knab
*Attorney, Agent, or Firm*—Robert A. Kent

[57] ABSTRACT

Set delayed cement compositions capable of being retained in pumpable fluid states for long time periods and then activated to set into hard masses and methods of using such compositions for cementing zones at remote locations are provided. The compositions are comprised of hydraulic cement, water, one or more hydratable gel forming materials and one or more methylenephosphonic acid derivative set delaying agents.

18 Claims, No Drawings

SET DELAYED CEMENT COMPOSITIONS AND METHODS OF USING THE SAME

BACKGROUND OF THE INVENTION

1. Field of the Invention

This invention relates to set delayed cement compositions capable of being retained in a pumpable fluid state for a long period of time and then activated to set into a hard mass. Methods of using the compositions for cementing zones at remote locations are also provided.

2. Description of the Prior Art

In cementing operations such as those carried out in oil, gas and water wells, industrial grouting operations, construction, etc., a hydraulic cement is mixed with water to form a cement slurry which is placed into the zone being cemented and allowed to set into a hard mass. When very large volumes of cement are utilized in cementing operations, such as in offshore platform grouting, the equipment required for mixing and pumping the large volumes of cement slurry is very expensive and often difficult to acquire and assemble at the location. The storage of the dry cement required (10,000 to 500,000 sacks of cement) prior to use is itself a major problem. The mixing and pumping of the large volumes of cement slurry can take long periods of time, e.g., up to thirty days.

On the other hand, when small volumes of cement slurry are used in small construction jobs or in plugging or squeezing operations carried out in oil, gas and water wells, the cost of equipment for transporting the cement and for mixing and pumping the cement slurry on location is often excessive as compared to the revenue generated as a result of carrying out the operation.

By the present invention, a set delayed cement composition capable of being retained in a pumpable fluid state for a long period of time, but which can be selectively activated to set into a hard mass is provided. The set delayed cement composition can be prepared at a convenient location and then transported to and stored at the job site until used. Just prior to placement of the cement composition it is mixed with a set activating agent and the resulting mixture is placed in the zone to be cemented whereby it sets into a hard mass therein. Thus, by the present invention, the heretofore required on-location bulk storage and mixing equipment can be eliminated.

SUMMARY OF THE INVENTION

Set delayed cement compositions which are capable of being retained in pumpable fluid states for long time periods and then activated to set into hard masses are provided. The compositions are each basically comprised of a hydraulic cement, sufficient water to form a pumpable slurry, a hydratable gel forming material present in the slurry in a quantity sufficient to minimize the settling of solids and separation of free water therefrom, and a set delaying agent comprised of a methylenephosphonic acid derivative or a mixture of such derivatives. When it is desired that the set delayed cement compositions set into hard masses, one or more set activating agents are mixed therewith.

The methylenephosphonic acid derivative set delaying agents which are suitable for use in accordance with this invention are as follows:

(1) Compounds having the structural formula:

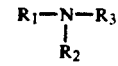

wherein:

$R_1$, $R_2$ and $R_3$ are independently hydrogen, $-CH_2PO_3(X)_2$ or $-CH_2CH_2-O-PO_3(X)_2$ with the limitation that one of $R_1$, $R_2$ and $R_3$ is always $-CH_2PO_3(X)_2$ or $-CH_2CH_2-O-PO_3(X)_2$;

X is hydrogen, an alkali metal cation, ammonium, a protonated amine or an alkaline earth metal cation in which case there is only one X per methylene phosphonate group; and at least one X is hydrogen which is associated with the nitrogen atom by way of an intramolecular hydrogen bond between the nitrogen atom and an oxygen atom attached to a phosphorus atom.

(2) Compounds having the structural formula:

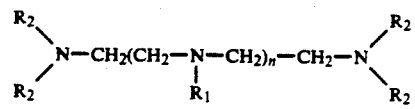

wherein:

n is an integer from 1 to 4;

$R_1$ is hydrogen or $-CH_2PO_3(X)_2$;

$R_2$ is hydrogen, $-CH_2PO_3(X)_2$ or $-CH_2CH_2N(R_3)_2$ wherein $R_3$ is hydrogen or $-CH_2PO_3(X)_2$;

X is hydrogen, an alkali metal cation, ammonium, a protonated amine or an alkaline earth metal cation in which case there is only one X per methylene phosphonate group; and at least one of $R_1$, $R_2$ or $R_3$ is $-CH_2PO_3(X)_2$ and one X is hydrogen which is associated with a nitrogen atom by way of an intramolecular hydrogen bond between the nitrogen atom and an oxygen atom attached to a phosphorus atom.

(3) Compounds having the structural formula:

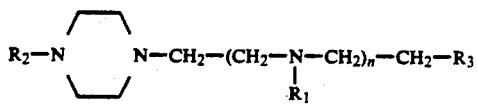

wherein:

n is an integer from 0 to 4;

$R_1$ is hydrogen or $-CH_2PO_3(X)_2$;

$R_2$ is hydrogen, $-CH_2PO_3(X)_2$ or $-CH_2CH_2N(R_4)_2$ wherein $R_4$ is hydrogen or $-CH_2PO_3(X)_2$;

$R_3$ is $-N(R_5)_2$ or

wherein $R_5$ is hydrogen or $-CH_2PO_3(X)_2$;

X is hydrogen, an alkali metal cation, ammonium, a protonated amine or an alkaline earth metal cation in which case there is only on X per methylen phosphonate group; and at least one of $R_1$, $R_2$ and $R_3$ is $-CH_2PO_3(X)_2$ and one X is hydrogen which is associated with a nitrogen atom by way of an intramolecular hydrogen bond between the nitrogen atom and an oxygen atom attached to a phosphorus atom.

(4) Compounds having the structural formula:

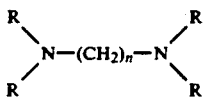

wherein:

n is an integer from 2 to 6;

R is hydrogen, —CH$_2$PO$_3$(X)$_2$ or —CH$_2$CH$_2$N(R$_1$)$_2$ wherein R$_1$ is hydrogen or —CH$_2$PO$_3$(X)$_2$;

X is hydrogen, an alkali metal cation, ammonium, a protonated amine or an alkaline earth metal cation in which case there is only one X per methylene phosphonate group; and at least one R is —CH$_2$PO$_3$(X)$_2$ and one X is hydrogen which is associated with a nitrogen atom by way of an intramolecular hydrogen bond between the nitrogen atom and an oxygen atom attached to a phosphorus atom.

(5) Compounds having the structural formula:

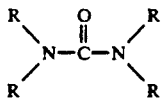

wherein:

R is hydrogen, —CH$_2$PO$_3$(X)$_2$ or —CH$_2$CH$_2$N(R$_1$)$_2$ wherein R$_1$ is hydrogen or —CH$_2$PO$_3$(X)$_2$;

X is hydrogen, an alkali metal cation, ammonium, a protonated amine or an alkaline earth metal cation in which case there is only one X per methylene phosphonate group; and at least one R is —CH$_2$PO$_3$(X)$_2$ and one X is hydrogen which is associated with a nitrogen atom by way of an intramolecular hydrogen bond between the nitrogen atom and an oxygen atom attached to a phosphorus atom.

(6) Compounds having the structural formula:

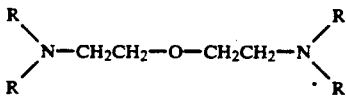

wherein:

R is hydrogen, —CH$_2$PO$_3$(X)$_2$ or —CH$_2$CH$_2$N(R$_1$)$_2$ wherein R$_1$ is hydrogen or —CH$_2$PO$_3$(X)$_2$;

X is hydrogen, an alkali metal cation, ammonium, a protonated amine or an alkaline earth metal cation in which case there is only one X per methylene phosphonate group; and at least one R is —CH$_2$PO$_3$(X)$_2$ and one X is hydrogen which is associated with a nitrogen atom by way of an intramolecular hydrogen bond between the nitrogen atom and an oxygen atom attached to a phosphorus atom.

(7) Compounds having the structural formula:

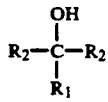

wherein:

R$_1$ is hydrogen or —CH$_3$;

R$_2$ is —CH$_2$PO$_3$(X)$_2$ or —CH$_2$NHCH$_2$PO$_3$(X)$_2$;

X is hydrogen, an alkali metal cation, ammonium, a protonated amine or an alkaline earth metal cation in which case there is only one X per methylene phosphonate group; and when nitrogen is present, at least one X is hydrogen which is associated with the nitrogen atom by way of an intramolecular hydrogen bond between the nitrogen atom and an oxygen atom attached to a phosphorus atom.

(8) Compounds having the structural formula:

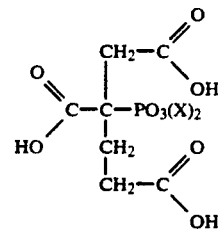

wherein:

X is hydrogen, an alkali metal cation, ammonium, a protonated amine or an alkaline earth metal cation in which case there is only one X per phosphonate group.

As mentioned above, most of the derivatives include at least one intramolecular hydrogen bond between a nitrogen atom and an oxygen atom which is attached to a phosphorus atom. The hydrogen involved in this bond is different from the other acidic hydrogens in that it is difficult to neutralize and should be left intact in the compound. That is, the removal of the intramolecular hydrogen bond formed when the methylenephosphonic acid derivative contains nitrogen greatly decreases or eliminates the effectiveness of the derivative as a cement composition set delaying agent. The other acidic protons may however be neutralized as indicated above.

Examples of suitable compounds falling in the various categories listed above are as follows:

(1) aminotri(methylenephosphonic acid), the sodium salt of aminotri(methylenephosphonic acid), and triethanolamine substituted with 3 moles of methylenephosphonic acid;

(2) ethylenediamine substituted with 1 to 4 moles of methylenephosphonic acid, the sodium salt of the foregoing compound, diethylenetriamine substituted with 1 to 5 moles of methylenephosphonic acid and triethylenetetramine substituted with 1 to 6 moles of methylenephosphonic acid;

(3) piperazinoethylethylenediamine substituted with 1 to 4 moles of methylenephosphonic acid and the sodium salt of this compound;

(4) propylenediamine substituted with 1 to 4 moles of methylenephosphonic acid, the sodium salt of the foregoing compound, and butylenediamine substituted with 1 to 4 moles of methylenephosphonic acid;

(5) urea substituted with 1 to 4 moles moles of methylenephosphonic acid;

(6) diethyleneamine ether substituted with 1 to 4 moles of methylenephosphonic acid;

(7) ethanol substituted with 1 or 2 moles of methylenephosphonic acid; and (8) 2-phosphono-butane-tricarboxylic acid.

Of the foregoing compounds aminotri(methylenephosphonic acid), ethylenediamine substituted with in the range of from 1 to 4 moles of methylenephosphonic acid, diethylenetriamine substituted with in the range of from 1 to 5 moles of methylenephosphonic acid, triethylenetetramine substituted with in the range of from 1 to 6 moles of methylenephosphonic acid, and mixtures of such compounds are preferred.

The most preferred compounds for use in the set delayed cement compositions of this invention are aminotri(methylenephosphonic acid) and methylenephosphonic acid substituted diethylenetriamine compounds having in the range of from 1 to 5 methylenephosphonic acid groups per mole, preferably from 3 to 5 methylenephosphonic acid groups per mole, and most preferably 5 methylenephosphonic acid groups per mole.

The aminotri(methylenephosphonic acid) and substituted diethylenetriamine compounds are formed by the addition of formaldehyde and orthophosphorus acid to aqueous solutions of ammonia or diethylenetriamine in the presence of an acid catalyst, preferably hydrochloric acid. Methylenephosphonic acid is generated in situ and substitutes at the nitrogen atom(s) of the ammonia or diethylenetriamine. In the case of ammonia, three methylenephosphonic acid groups are attached to the nitrogen atom. In diethylenetriamine, there are five sites which can be substituted with methylenephosphonic acid groups corresponding to each (—N—H) functionality in the molecule. The degree of substitution depends on the molar ratio of the starting reactants and the reaction conditions. It is possible for a diethylenetriamine molecule to contain from 1 to 5 methylenephosphonic acid groups.

When aldehydes or ketones having boiling points below the temperatures at which this invention is practiced are utilized in the practice of the invention, usually significantly better yields of the desirable aminoalkylene phosphonic acids (based on the amount of aldehyde or ketone charged into the reaction vessel) can be attained if the aldehyde or ketone is added slowly to the mixture of orthophosphorus acid and reactive nitrogenous material, while the temperature of said mixture is within the desired range. For example, when an aqueous mixture consisting of one mole of ammonia, three moles of orthophosphorus acid, and three moles of formaldehyde (calculated theoretically to result in the production of one mole of ammonium trimethylenephosphonic acid) is held at 100° C. for an extended period of time (in order to assure "complete" reaction), only about 0.45 mole of the desired product is made. However, if the same amount of formaldehyde is added slowly (i.e., over a period of about 15 minutes) to a blend of the same amount of water, one mole of ammonia, and three moles of phosphorus acid held at a temperature of about 100° C., more than 0.70 mole of the desired product is produced. Thus, the addition of the aldehyde or ketone slowly to a hot mixture of phosphorus acid plus one of the desirable reactive nitrogenous materials described above is preferred.

The particular quantity of the set delaying agent or agents added to an aqueous hydraulic cement slurry controls the duration of the time the cement composition will remain in a pumpable fluid state. However, in accordance with the present invention, a quantity is utilized which will allow the resulting cement composition to be retained in a pumpable fluid state for a period of time exceeding the required time. After this time, the cement composition is activated by mixing a set activating agent therewith just prior to placement as will be described in detail hereinbelow. Generally, the set delaying phosphonic acid derivative or derivatives utilized are combined with an aqueous hydraulic cement slurry in an amount in the range of from about 0.1% to about 5.0% by weight of dry cement utilized to form the slurry. Such a quantity will cause the slurry to remain in a pumpable fluid state for a time period ranging from about 1 day up to about 45 days.

In order to prevent or at least minimize the settling of solids and/or the separation of free water from the set delayed cement compositions during long-term storage, one or more hydratable gel forming materials are combined with the compositions which hydrate therein to provide gel strength and limited viscosity to the compositions. While various hydratable materials can be utilized, particularly suitable such materials are those selected from the group consisting of hydratable cellulose derivatives, polyvinyl alcohol, and homopolymers, copolymers and/or terpolymers of 2-acrylamido-2-methylpropane sulfonic acid, sodium vinylsulfonate, acrylamide, N,N-dimethylacrylamide, acrylic acid, and mixtures of the foregoing compounds. Of these, hydratable cellulose derivatives such as hydroxyalkylcellulose, carboxyalkylcellulose and carboxyalkylhydroxyalkylcellulose are preferred. The most preferred such hydratable material is hydroxyethylcellulose.

As mentioned above, the hydratable gel forming material or materials used are combined with the cement compositions in relatively small amounts so that the settling of solids and separation of free water are minimized but the viscosity of the cement composition is not increased to the point whereby pumpability is reduced. Generally, the hydratable material is combined with a cement composition of this invention in an amount in the range of from about 0.01% to about 1.5% by weight of dry cement therein. When the hydratable material is selected from the group consisting of hydroxyalkylcellulose, carboxyalkylcellulose, carboxyalkylhydroxyalkycellulose and mixtures thereof, the material or materials are combined with the cement slurry in an amount in the range of from about 0.1% to about 1.0% by weight of dry cement therein. The preferred hydratable gel forming material i.e., hydroxyethylcellulose, is preferably combined with the aqueous cement slurry in an amount in the range of from about 0.1% to about 0.5% by weight of dry cement therein, most preferably about 0.2%.

A set delayed cement composition of this invention is comprised of a hydraulic cement, sufficient water to form a pumpable slurry, a hydratable gel forming material selected from the group consisting of hydratable cellulose derivatives, polyvinyl alcohol, and polymers of 2-acrylamido-2-methylpropane sulfonic acid, sodium vinylsulfonate, acrylamide, N,N-dimethylacrylamide, acrylic acid, and mixtures of the foregoing compounds present in the slurry in a quantity sufficient to minimize the settling of solids and separation of free water therefrom, and a set delaying agent comprised of a methylenephosphonic acid derivative present in the slurry in an amount in the range of from about 0.1% to about 5.0% by weight of dry cement therein, the methylenephosphonic acid derivative being selected from the group consisting of compounds having the general formula:

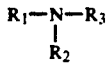

wherein:

R$_1$, R$_2$ and R$_3$ are independently hydrogen, —CH$_2$PO$_3$(X)$_2$ or —CH$_2$CH$_2$—O—PO$_3$(X)$_2$ with the limitation that one of R$_1$, R$_2$ and R$_3$ is always —CH$_2$PO$_3$(X)$_2$ or —CH$_2$CH$_2$—O—PO$_3$(X)$_2$;

X is hydrogen, an alkali metal cation, ammonium, a protonated amine or an alkaline earth metal cation in which case there is only one X per methylene phosphonate group; and at least one X is hydrogen which is associated with the nitrogen atom by way of an intramolecular hydrogen bond between the nitrogen atom and an oxygen atom attached to a phosphorus atom;

compounds having the structural formula:

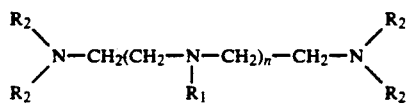

wherein:

n is an integer from 1 to 4;

R$_1$ is hydrogen or —CH$_2$PO$_3$(X)$_2$;

R$_2$ is hydrogen, —CH$_2$PO$_3$(X)$_2$ or —CH$_2$CH$_2$N(R$_3$)$_2$ wherein R$_3$ is hydrogen or —CH$_2$PO$_3$(X)$_2$;

X is hydrogen, an alkali metal cation, ammonium, a protonated amine or an alkaline earth metal cation in which case there is only one X per methylene phosphonate group; and at least one of R$_1$, R$_2$ or R$_3$ is —CH$_2$PO$_3$(X)$_2$ and one X is hydrogen which is associated with a nitrogen atom by way of an intramolecular hydrogen bond between the nitrogen atom and an oxygen atom attached to a phosphorus atom;

compounds having the structural formula:

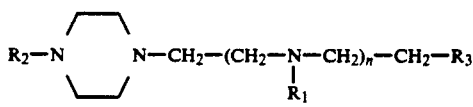

wherein:

n is an integer from 0 to 4;

R$_1$ is hydrogen or —CH$_2$PO$_3$(X)$_2$;

R$_2$ is hydrogen, —CH$_2$PO$_3$(X)$_2$ or —CH$_2$CH$_2$N(R$_4$)$_2$ wherein R$_4$ is hydrogen or —CH$_2$PO$_3$(X)$_2$;

R$_3$ is —N(R$_5$)$_2$ or

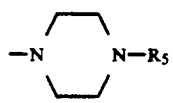

wherein R$_5$ is hydrogen or —CH$_2$PO$_3$(X)$_2$;

X is hydrogen, an alkali metal cation, ammonium, a protonated amine or an alkaline earth metal cation in which case there is only one X per methylene phosphonate group; and at least one of R$_1$, R$_2$ or R$_3$ is —CH$_2$PO$_3$(X)$_2$ and one X is hydrogen which is associated with a nitrogen atom by way of an intramolecular hydrogen bond between the nitrogen atom and an oxygen atom attached to a phosphorus atom;

compounds having the structural formula:

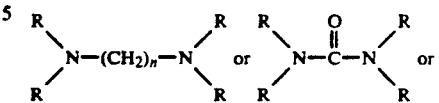

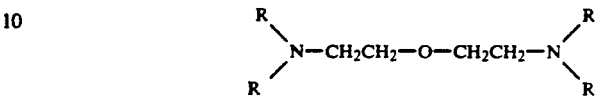

wherein:

n is an integer from 2 to 6;

R is hydrogen, —CH$_2$PO$_3$(X)$_2$ or —CH$_2$CH$_2$N(R$_1$)$_2$ wherein R$_1$ is hydrogen or —CH$_2$PO$_3$(X)$_2$;

X is hydrogen, an alkali metal cation, ammonium, a protonated amine or an alkaline earth metal cation in which case there is only one X per methylene phosphonate group; and at least one R is —CH$_2$PO$_3$(X)$_2$ and one X is hydrogen which is associated with a nitrogen atom by way of an intramolecular hydrogen bond between the nitrogen atom and an oxygen atom attached to a phosphorus atom;

compounds having the structural formula:

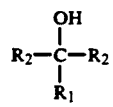

wherein:

R$_1$ is hydrogen or —CH$_3$;

R$_2$ is —CH$_2$PO$_3$(X)$_2$ —CH$_2$NHCH$_2$PO$_3$(X)$_2$;

X is hydrogen, an alkali metal cation, ammonium, a protonated amine or an alkaline earth metal cation in which case there is only one X per methylene phosphonate group; and when nitrogen is present, at least one X is hydrogen which is associated with the nitrogen atom by way of an intramolecular hydrogen bond between the nitrogen atom and an oxygen atom attached to a phosphorus atom; and mixtures of such compounds.

A preferred set delayed cement composition capable of being retained in a pumpable fluid state for a long time period and then caused to set by mixing a set activating agent therewith just prior to placement is comprised of a hydraulic cement, sufficient water to form a pumpable slurry, a hydratable gel forming material selected from the group consisting of hydroxyalkylcellulose, carboxyalkylcellulose, carboxyalkylhydroxyalkylcellulose, and mixtures thereof present in the composition in an amount in the range of from about 0.1% to about 1.0% by weight of dry cement therein, and a set delaying agent selected from the group consisting of aminotri(methylenephosphonic acid), diethylenetriamine substituted with 5 moles of methylenephosphonic acid, and mixtures of such compounds present in the composition in an amount in the range of from about 0.1% to about 2.5% by weight of dry cement therein.

Portland cement is generally preferred for use in the compositions of this invention because of its low cost, availability and general utility, but other cements can also be utilized. Portland cements of API Classes H and G are preferred cements for use in this invention in most instances, although the other API classes of cement can also be utilized. The characteristics of these cements are described in API Specification 10, Second Edition dated June 15, 1984, of the American Petroleum Institute which is incorporated herein by reference. A highly useful and effective cement slurry base for use in practicing this invention utilizes API Class H Portland cement mixed with water to provide a density of from about 11.3 to about 18.0 pounds per gallon.

The water used in the cement compositions can be water from any source, provided that it does not contain an excess of compounds which adversely react with other components in the cement compositions or otherwise affect the stability of the compositions.

A particularly preferred set delayed cement composition of this invention capable of being retained in a pumpable fluid state for a long time period and then caused to set by mixing a set activating agent therewith is comprised of API Class H Portland cement, water in an amount in the range of from about 38% to about 46% by weight of dry cement, hydroxyethylcellulose in an amount in the range of from about 0.1% to about 0.5% by weight of dry cement therein, most preferably 0.2%, and aminotri(methylenephosphonic acid) or diethylenetriamine substituted with 5 moles of methylenephosphonic acid present in an amount in the range of from about 0.2% to about 0.7% by weight of dry cement. Most preferably, the set delaying agent is aminotri(methylenephosphonic acid) and is present in the composition in an amount of about 0.5% by weight of dry cement therein.

The set delaying or retarding affect imparted to the set delayed cement compositions of this invention can be terminated by heating the cement compositions to a high temperature, e.g., above roughly 300° F. depending on the concentration of the set delaying agent. Thus, when using the cement composition for carrying out cementing operations in such high temperature environments, the compositions can be placed therein whereby they are activated upon being heated and eventually set into hard masses. A more preferred technique for activating the set delayed compositions is to mix one or more set activating agents with the compositions just prior to placement. Particularly suitable such set activating agents are aqueous sodium silicate solutions, paraformaldehyde, calcium chloride and mixtures of two or more such agents.

Sodium silicate is readily commercially available in aqueous solutions of various grades. An aqueous sodium silicate solution having a density of 11.67 pounds per gallon and an $Na_2O:SiO_2$ weight ratio of about 1:3.22 is particularly suitable for use in accordance with this invention, but other solutions can be used.

When a low density cement composition is desired, an aqueous sodium silicate solution extender can be combined with a set delayed cement composition of this invention in a relatively large quantity (up to 100% by volume of the cement composition) to produce a lightweight activated cement composition (the sodium silicate solution functions as an extender to lower the density and also as an activating agent). Preferably, a small quantity of calcium chloride or paraformaldehyde set activating agent is combined with the set delayed cement composition in addition to the aqueous sodium silicate solution. The preferred set activating agent for normal density cement compositions (those not including an extender) is a mixture of paraformaldehyde and calcium chloride in equal proportions. Generally, the set activating agent used is combined with a set delayed cement composition in an amount in the range of from about 0.5% to about 2.5% by weight of the cement composition.

In carrying out the methods of this invention for cementing a zone at a remote location, a set delayed cement composition of the type described above is first prepared at a convenient location. Once prepared, the set delayed composition is then transported to the remote location and, if required, stored at such location. When all or part of the stored cement composition which is in a pumpable fluid state is to be used, it is mixed with a set activating agent or agents of the type described above followed by the placement of the activated mixture in the zone to be cemented. A particularly convenient technique for mixing the activating agent and other components such as an aqueous sodium silicate solution extender and/or other additives is to combine the activating agent and other components and/or additives with the set delayed cement composition on the fly, i.e., the activating agent and other components and/or additives are continuously mixed with the set delayed cement composition as they both are pumped into the zone to be cemented.

As will be understood by those skilled in the art, a variety of additives can be incorporated in the cement compositions to modify the properties thereof such as dispersents, viscosifiers, and weight adjusting materials. Also, additives for reducing fluid loss to surrounding formations, for reducing friction during pumping, and for imparting other properties to the cement compositions can be utilized.

In order to facilitate a clear understanding of the set delayed compositions and methods of this invention, the following examples are given.

EXAMPLE 1

The set delayed cement compositions capable of being retained in pumpable fluid states for long periods of time must have a minimum settling of solids and separation of free water during storage. Once the cement compositions are to be pumped, they must be capable of being activated whereby hydration of the cement occurs and reasonable compressive strengths are developed. The activating agents must not flash-set the compositions in that the compositions must be placed with adequate margins of safety after the activating agents are mixed therewith.

Three basic types of tests are performed to show the above requirements, i.e., free water and settling tests, pumpability tests and compressive strength tests.

The free water and settling tests consist of preparing aqueous hydraulic cement slurries containing various amounts of hydratable gel forming material (hydroxyethylcellulose) and set delaying agent (aminotri(methylenephosphonic acid)) and placing the slurries in covered 500 cc plastic beakers. The slurries are observed on a daily basis for solids settlement and free water separation over time periods up to 33 days. The results of these tests are set forth in Table I.

The pumpability (maintenance of the compositions in a fluid state) tests are carried out in the same manner as the free water and settling tests described above. That is, various set delayed cement slurries are prepared and placed in additional 500 cc plastic beakers which are observed for pumpability, i.e., the samples are stirred by hand and visually examined for pumpability. The results of these tests are shown in Table II below.

Cement compositions containing various amounts of hydratable gel forming material (hydroxyethylcellulose) and set delaying agent (aminotri(methylenephosphonic acid)) are combined with various set activating agents and then allowed to set. The set compositions are tested for compressive strength at 24, 48 and 72 hours in accordance with the standard API compressive strength testing procedures set forth in the publication API Specification 10, Second Edition, June 15, 1984, which is incorporated herein by reference. The results of these tests are given in Table III below.

TABLE I

Free Water, Settling and Fluid Time of Set Delayed Cement Compositions
Base Slurry: API Class H Cement + 40%[1] Water (16.2 lbs/gal Density)

| Test No. | %[1] Set Delaying Agent[2] | %[1] Hydratable Gel Forming Agent[3] | Free Water and Settling[5] | Fluid Time (Days) |
|---|---|---|---|---|
| 1 | 1.0 | — | large | not determined[6] |
| 2 | 1.0 | 1.0[4] | 0 | not determined |
| 3 | 1.0 | 0.75[4] | 0 | not determined |
| 4 | 1.0 | 0.6[4] | 0 | not determined |
| 5 | 1.0 | 0.5 | 0 | not determined |
| 6 | 1.0 | 0.45 | trace | not determined |
| 7 | 1.0 | 0.3 | large | not determined |
| 8 | 0.3 | 0.2 | large | not determined |
| 9 | 0.4 | 0.2 | large | 33 |
| 10 | 0.5 | 0.2 | large | not determined |
| 11 | 0.5 | 0.375 | small | not determined |
| 12 | 0.5 | 0.55 | 0 | not determined |
| 13 | 0.75 | 0.425 | trace | 33+ |
| 14 | 0.75 | 0.55 | 0 | 33+ |
| 15 | 0.75 | 0.475 | trace | 33+ |
| 16 | 1.0 | 0.55 | 0 | 21+ |
| 17 | 1.0 | 0.475 | 0 | 21+ |

[1]% by weight of dry cement utilized in base slurry.
[2]Fifty percent active, aqueous solution of aminotri(methylenephosphonic acid)-[N(CH$_2$PO$_3$H$_2$)$_3$].
[3]hydroxyethylcellulose
[4]This slurry involved a high viscosity.
[5]In these slurries, free water and settling were synonymous. That is, slurries with large free water values also settled while slurries with low free water values did not.
[6]Since slurries initially demonstrating measurable free water or viscosity problems were considered unacceptable, the fluid time of these slurries was not measured.

TABLE II

Pumpability of Set Delayed Cement Compositions
Base Slurry: API Class H Cement + 0.5%[1] Hydroxyethylcellulose + 40%[1] Water (16.2 lbs/gal Density)

| %[1] Set Delaying Agent[2] | Fluid Time (Days) 80° F. | 100° F. |
|---|---|---|
| 0.05 | 1 | 1 |
| 0.1 | 2 | 2 |
| 0.2 | 6 | 13 |
| 0.3 | 20 | 28+ |
| 0.4 | 28 | 28+ |
| 0.5 | 28+ | 28+ |

[1]% by weight of dry cement utilized in base slurry.
[2]Aminotri(methylene phosphonic acid)-[N(CH$_2$PO$_3$H$_2$)$_3$]

From Table I above, it can be seen that a concentration of about 0.5% hydratable gel forming material in the cement compositions provides good settling and free water control without resulting in high viscosity. Table II shows that the time period the compositions remain in a pumpable fluid state depends upon the quantity of set delaying agent utilized.

TABLE III

Compressive Strengths - 80° F.
Base Slurry: API Class H Cement + 0.5%[1] hydroxyethylcellulose + 40%[1] Water (16.2 lbs/gal Density)

| Test No. | %[1] Set Delaying Agent[2] | Set Activating Agents %[1] Paraformaldehyde | %[1] CaCl$_2$ | Compressive Strength (PSI) 1 day | 2 day | 3 day |
|---|---|---|---|---|---|---|
| 1 | 0.05 | 1 | — | 25 | 1215 | 1825 |
| 2 | 0.1 | 1 | — | Not Set | 473 | 1465 |
| 3 | 0.2 | 1 | — | Not Set | Not Set | 455 |
| 4 | 0.05 | 1 | 1 | 650 | 1350 | 1690 |
| 5 | 0.1 | 1 | 1 | 586 | 1725 | 2295 |
| 6 | 0.2 | 1 | 1 | 150 | 1185 | 2025 |
| 7 | 0.05 | — | 1 | 945 | 1410 | — |
| 8 | 0.1 | — | 1 | 710 | 1185 | — |
| 9 | 0.2 | — | 1 | Not Set | 395 | — |

[1]% by weight of dry cement utilized in base slurry.
[2]Aminotri(methylene phosphonic acid) [N(CH$_2$PO$_3$H$_2$)$_3$]

EXAMPLE 2

Set delayed cement compositions are prepared and combined with various amounts of various set activating agents as well as with various diluted aqueous sodium silicate solutions to produce low densities. The slurries are poured into 250 cc plastic beakers with lids and placed in water baths at 80° F. A penetrometer is used to determine 24, 48 and 72 hour and 7 day compressive strengths. The results of these tests are shown in Table IV and V below.

TABLE IV

Penetrometer Compressive Strengths (PSI)
Base Slurry: API Class H Cement + 1%[1] Set Delaying Agent[2] + 0.5%[1] Hydroxyethylcellulose + 40%[1] Water + Set Activating Agent and Extender[3] Solution Initial Slurry Density: 16.2 lbs/gal.

| Test No. | Concentration of Set Activating Agent and Extender[3] in Solution, % by Volume of Solution | Free Water | Penetrometer Compressive Strength (psi) 1 day | | 2 day | | 3 day | | 7 day | |
|---|---|---|---|---|---|---|---|---|---|---|
| 1 | 7 | small | 10[4] | (10)[5] | 180[4] | (225)[5] | 525[4] | (330)[5] | 700+[4] | (570)[5] |
| 2 | 9 | small | 20 | (30) | 240 | (310) | 310 | (465) | 400 | (700) |
| 3 | 12 | 0 | 10 | (10) | 160 | (200) | 340 | (380) | 700 | (660) |
| 4 | 14 | 0 | 20 | (10) | 120 | (140) | 270 | (380) | 700 | (550) |

TABLE IV-continued

Penetrometer Compressive Strengths (PSI)
Base Slurry: API Class H Cement + 1%[1] Set Delaying Agent[2] + 0.5%[1] Hydroxyethylcellulose + 40%[1] Water + Set Activating Agent and Extender[3] Solution Initial Slurry Density: 16.2 lbs/gal.

| Test No. | Concentration of Set Activating Agent and Extender[3] in Solution, % by Volume of Solution | Free Water | Penetrometer Compressive Strength (psi) | | | | | | |
|---|---|---|---|---|---|---|---|---|---|
| | | | 1 day | | 2 day | | 3 day | | 7 day |
| 5 | 18 | 0 | 70 | (70) | 165 | (150) | 210 | (190) | 700 (700) |

[1]Percents are by weight of dry cement utilized in base slurry.
[2]Aminotri(methylenephosphonic acid)-[N(CH$_2$PO$_3$H$_2$)$_3$].
[3]Aqueous solution containing a sodium silicate with a weight ratio of 1 Na$_2$O to 3.22 SiO$_2$.
[4]compositions also contain paraformaldehyde in an amount of 1% by weight of dry cement.
[5]compositions also contain paraformaldehyde and calcium chloride in amounts of 1% by weight of dry cement, each.

TABLE V

Penetrometer Compressive Strengths[4] (PSI)
Base Slurry: API Class H Cement + 0.5%[1] Set Delaying Agent[2] + 0.5%[1] Hydroxyethylcellulose + 1%[1] CaCl$_2$ + 40%[1] Water Initial slurry density = 16.2 lbs/gal.

| Test No. | Density | %[1] Paraformaldehyde | % Extender[3] | Penetrometer Compressive Strength | | |
|---|---|---|---|---|---|---|
| | | | | 1 day | 2 day | 3 day |
| 1 | 11.28 | — | 100 | 380 | 600 | 700+ |
| 2 | 11.28 | 1 | 100 | 90 | 220 | 440 |
| 3 | 12.96 | — | 60 | 700+ | 700+ | 700+ |
| 4 | 12.96 | 1 | 60 | 700+ | 700+ | 700+ |
| 5 | 13.59 | — | 40 | 380 | 700+ | 700+ |
| 6 | 13.59 | 1 | 40 | 700+ | 700+ | 700+ |

[1]Percents are by weight of dry cement utilized in base slurry.
[2]Aminotri(methylenephosphonic acid) [N(CH$_2$PO$_3$H$_2$)$_3$].
[3]Sea water solution containing 18% by volume sodium silicate with a 1 Na$_2$O to 3.22 SiO$_2$ weight ratio.
[4]set delayed compositions in fluid state for 28 days prior to being activated.

Table IV shows that the compositions containing 1% paraformaldehyde activating agent produce equivalent compressive strength to the compositions containing 1% amounts of both paraformaldehyde and calcium chloride activating agents.

Table V shows the compressive strengths of cement compositions activated with paraformaldehyde and/or an aqueous sodium silicate solution after the compositions have remained fluid for 28 days. The compositions are diluted with various amounts of sea water containing 18% by volume aqueous sodium silicate to obtain three different densities at the time the activating agents are added to the compositions.

EXAMPLE 3

Set delayed cement compositions containing various amounts of set delaying agent are prepared. The compositions are refrigerated at 20° F. for 7 days and then heated to 80° F. for 4 hours. After heating, the compositions are combined with various quantities and combinations of set activating agents, allowed to set and tested for compressive strengths using a penetrometer at 1 and 2 days. The results of these tests are given in Table VI below.

TABLE VI

Compressive Strengths Penetrometer
Base Slurry: API Class H Cement + 40%[1] Water (16.2 lbs/gal Density)

| Test No. | %[1] Set Delaying Agent[2] | %[1] Paraformaldehyde | %[1] CaCl$_2$ | %[1] Formaldehyde | Compressive Strength[3] (PSI) | |
|---|---|---|---|---|---|---|
| | | | | | 1 day | 2 day |
| 1 | 1 | 2 | — | — | Not Set | Not Set |
| 2 | 0.75 | 2 | — | — | Not Set | Not Set |
| 3 | 0.5 | 2 | — | — | Not Set | Not Set |
| 4 | 1 | 1 | 1 | — | 150 | 700 |
| 5 | 0.75 | 1 | 1 | — | 700+ | — |
| 6 | 0.5 | 1 | 1 | — | 700+ | — |
| 7 | 1 | — | 1 | 1 | Not Set | Not Set |
| 8 | 0.75 | — | 1 | 1 | Not Set | Not Set |
| 9 | 0.5 | — | 1 | 1 | Not Set | 700+ |

[1]Percents are by weight of dry cement utilized in base slurry.
[2]Fifty percent aqueous solution of aminotri(methylenephosphonic acid)-[N(CH$_2$PO$_3$H$_2$)$_3$].
[3]After 7 days at 20° F. and 4 hrs at 80° F. before activation.

As shown in Table VI, paraformaldehyde in combination with calcium chloride produces the most rapid compressive strength development and the compressive strength is not affected by storing the set delayed slurry at 20° F for seven days.

EXAMPLE 4

Set delayed cement compositions are prepared using fresh water, sea water and various set delaying agents. The descriptions of the set delaying agents used are set forth in Table VII below. Free water, settling and fluid time tests are carried out on the compositions in the manner described in Example 1. The results of these tests are set forth in Tables VII, VIII and IX below.

TABLE VII

Description of Set Delaying Agents

| No. | Form | pH | Activity (Active Acid) | Description |
|---|---|---|---|---|
| 1 | Liquid | 2 | 50% | Aqueous solution of aminotri(methylenephosphonic acid)-[N(CH$_2$PO$_3$H$_2$)$_3$]. |
| 2 | Solid | — | 44% | Same as No. 1; dry neutralized (Na$_2$CO$_3$) solid. |
| 3 | Liquid | 10–11 | 30% | Same as No. 1; aqueous solution of pentasodium salt. |
| 4 | Liquid | 7–8 | 40% | Same as No. 1; formulation of sodium and triethanolamine salts. |
| 5 | Liquid | <2 | 60% | 1-hydroxyethylidene-1,1-diphosphonic acid (HEDP) or etidronic acid (EHDP). |
| 6 | Solid | — | 46% | Same as No. 5; dry neutralized (Na$_2$CO$_3$) solid. |
| 7 | Solid | — | 90% | Ethylenediamine tetra(methylenephosphonic acid) (EDTMPA). |
| 8 | Liquid | 6–8 | 30% | Same as No. 7; aqueous solution of ammonium salt. |
| 9 | Liquid | 6–8 | 17% | Same as No. 7; aqueous solution of potassium salt. |

TABLE VII-continued

Description of Set Delaying Agents

| No. | Form | pH | Activity (Active Acid) | Description |
|---|---|---|---|---|
| 10 | Solid | — | 97% | Hexamethylenediamine tetra(methylenephosphonic acid) (HMDTMPA). |
| 11 | Liquid | — | 29% | Same as No. 10; aqueous solution of ammonium salt. |
| 12 | Liquid | 6–8 | 25% | Same as No. 10; aqueous solution of potassium salt. |
| 13 | Liquid | <2 | 50% | Diethylenetriamine penta(methylenephosphonic acid) (DETPMPA). |
| 14 | Liquid | — | — | Same as No. 13; aqueous solution of sodium salt. |
| 15 | Liquid | 1 | — | Phosphomethylated residue from the fractional distillation of mixtures of various ethylenediamines. |
| 16 | Liquid | <2 | 40% | Diethylenetriamine penta(methylenephosphonic acid) from different source than 13. |
| 17 | Liquid | <2 | 45% | Same as No. 1; except contains more residual chloride |
| 18 | Liquid | <1 | 46% | UREA tetra(methylenephosphonic acid). |
| 19 | Liquid | 2.1 | 66% | Tri(methylenephosphonic acid) derivative of triethanolamine. |
| 20 | Liquid | 8.5 | 64% | Same as No. 16; aqueous solution of sodium salt from different source than 19. |

TABLE VIII

Free Water, Settling and Fluid Time
Base Slurry: API Class A Cement + 104%[1] Sea Water + 0.6%[1] Hydroxyethylcellulose
Test Conditions: Room Temperature and Pressure

| Test No. | Set Delaying Agent No. (See Table VII) | %[1] Set Delaying Agent | Settling & Free Water | pH | Fluid Time (days) |
|---|---|---|---|---|---|
| 1 | 16 | 1.0 | Slight | 3 | 9 |
| 2 | 16 | 1.0 | Slight | 7 | 11 |
| 3 | 17 | 1.0 | Slight | 3 | 7 |
| 4 | 17 | 1.0 | Slight | 7 | 7 |

[1]% by weight of dry cement utilized in base slurry.

TABLE IX

Free Water, Settling and Fluid Time
Base Slurry: API Class A Cement + 0.2%[1] Hydroxyethylcelluose + 54%[1] water
Slurry density: 16.2 lbs/gal.
Test Conditions: Room Temperature and Pressure

| Test No. | Set Delaying Agent No. (See Table VII) | %[1] Set Delaying Agent | Settling & Free Water | Fluid Time (days) |
|---|---|---|---|---|
| 1 | 1 | 1.0 | Slight | 24 |
| 2 | 3 | 1.0 | Slight | 12 |
| 3 | 5 | 1.0 | Slight | 12 |
| 4 | 13 | 1.0 | Slight | 19 |
| 5 | 16 | 1.0 | Slight | 21 |
| 6 | 18 | 1.0 | Slight | 15 |
| 7 | 17 | 1.0 | Slight | 15 |

[1]% by weight of dry cement utilized in base slurry.

The above data shows that a variety of methylenephosphonic acid set delaying agents can be utilized and that API Class A cement slurries are delayed differently than when API Class H cement is utilized. Also, the utilization of sea water changes the effect of the set delaying agents.

EXAMPLE 5

A set delayed cement composition of this invention is prepared containing API Class H cement, water, hydroxyethylcellulose and aminotri(methylenephosphonic acid). The set delayed composition is combined with various set activating agent or agents and various quantities of sodium silicate solution and allowed to set. The set compositions are tested for compressive strength at 6 months in accordance with the standard API compressive strength testing procedures set forth in the publication API Specification 10, Second Edition, June 15, 1984. The results of these tests are given in Table X below.

TABLE X

Six Month Compressive Strength Data
Base Slurry: API Class H Cement + 0.5%[1] Hydratable Gel Forming Material[2] + 0.5%[1] Set Delaying Agent[3] + 40%[1] Water Slurry density: 16.2 lbs/gal.
Conditions: Ambient Temperature and Pressure

| %[1] Paraformaldehyde $(CH_2O)_x$ | %[1] Calcium Chloride | %[4] Aqueous Sodium Silicate Solution[5] | Density (lbs/gal) | Strength (psi) |
|---|---|---|---|---|
| — | — | 100 | 11.5 | 230 |
| — | 1 | 100 | 11.5 | 590 |
| 1 | — | 100 | 11.5 | 480 |
| — | — | 60 | 12.5 | 1700 |
| — | 1 | 60 | 12.5 | 1820 |
| 1 | — | 60 | 12.5 | 2100 |
| — | — | 40 | 13.5 | 2960 |
| — | 1 | 40 | 13.5 | 2630 |
| 1 | — | 40 | 13.5 | 4030 |
| 1 | 1 | — | 16.2 | 3420 |
| 1 | — | — | 16.2 | 8950 |
| 1 | 1 | — | 16.2 | 9900 |

[1]% by weight of dry cement utilized in base slurry.
[2]hydroxyethylcellulose
[3]aminotri(methylenephosphonic acid) [N(CH$_2$PO$_3$H$_2$)$_3$].
[4]% by weight of base slurry
[5]An aqueous solution containing 18% by weight sodium silicate with a 1 Na$_2$O to 3.22 SiO$_2$ weight ratio.

The data of Table X shows that good compressive strengths are obtained using the cement compositions of the present invention.

What is claimed is:

1. A set delayed cement composition capable of being retained in a pumpable fluid state for a long period of time and then activated to set into a hard mass comprising:
   a hydraulic cement;
   sufficient water to form a pumpable slurry;
   a hydratable gel forming material selected from the group consisting of hydratable cellulose derivatives, polyvinyl alcohol, and polymers of 2- acrylamido-2-methylpropane sulfonic acid, sodium vinylsulfonate, acrylamide, N,N-dimethylacrylamide, acrylic acid, and mixtures of the foregoing compounds present in said slurry in an amount in the range of from about 0.01% to about 1.5% by weight of dry cement to minimize the settling of solids and separation of free water therefrom; and a set delaying agent comprised of a methylenephosphonic acid derivative present in said slurry in an amount in the range of from about 0.1% to about 5.0% by weight of dry cement therein, said methylenephosphonic acid derivative being selected from the group consisting of compounds having the general formula:

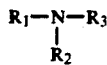

wherein:

$R_1$, $R_2$ and $R_3$ are independently hydrogen, $-CH_2PO_3(X)_2$ or $-CH_2CH_2-O-PO_3(X)_2$ with the limitation that one of $R_1$, $R_2$ and $R_3$ is always $-CH_2PO_3(X)_2$ or $-CH_2CH_2-O-PO_3(X)_2$;

X is hydrogen, an alkali metal cation, ammonium, a protonated amine or an alkaline earth metal cation in which case there is only one X per methylenephosphonate group; and at leat one X is hydrogen which is associated with the nitrogen atom by way of an intramolecular hydrogen bond between the nitrogen atom and an oxygen atom attached to a phosphorus atom;

compounds having the structural formula:

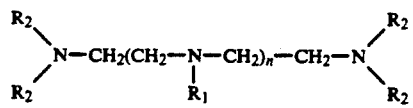

wherein:

n is an integer from 1 to 4;

$R_1$ is hydrogen or $-CH_2PO_3(X)_2$;

$R_2$ is hydrogen, $-CH_2PO_3(X)_2$ or $-CH_2CH_2N(R_3)_2$ wherein $R_3$ is hydrogen or $-CH_2PO_3(X)_2$;

X is hydrogen, an alkali metal cation, ammonium, a protonated amine or an alkaline earth metal cation in which case there is only one X per methylenephosphonate group; and at least one of $R_1$, $R_2$ or $R_3$ is $-CH_2PO_3(X)_2$ and one X is hydrogen which is associated with a nitrogen atom by way of an intramolecular hydrogen bond between the nitrogen atom and an oxygen atom attached to a phosphorus atom;

compounds having the structural formula:

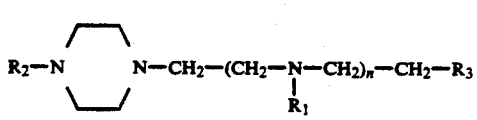

wherein:

n is an integer from 0 to 4;

$R_1$ is hydrogen or $-Ch_2PO_3(X)_2$;

$R_2$ is hydrogen, $-CH_2PO_3(X)_2$ or $-CH_2CH_2N(R_4)_2$ wherein $R_4$ is hydrogen or $-CH_2PO_3(X)_2$;

$R_3$ is $-N(R_5)_2$ or

wherein $R_5$ is hydrogen or $-CH_2PO_3(X)_2$;

X is hydrogen, an alkali metal cation, ammonium, a protonated amine or an alkaline earth metal cation in which case there is only one X per methylenephosphonate group; and at least one of $R_1$, $R_2$ or $R_3$ is $-CH_2PO_3(X)_2$ and one X is hydrogen which is associated with a nitrogen atom by way of an intramolecular hydrogen bond between the nitrogen atom and an oxygen atom attached to a phosphorus atom;

compounds having the structural formula:

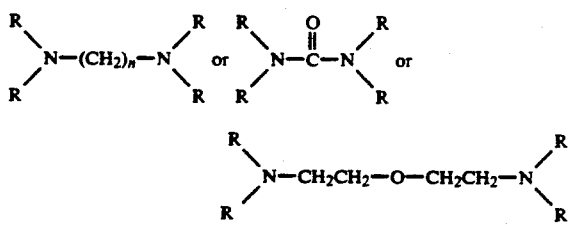

wherein:

n is an integer from 2 to 6;

R is hydrogen, $-CH_2PO_3(X)_2$ or $-CH_2CH_2N(R_1)_2$ wherein $R_1$ is hydrogen or $-CH_2PO_3(X)_2$;

X is hydrogen, an alkali metal cation, ammonium, a protonated amine or an alkaline earth metal cation in which case there is only one X per methylenephosphonate group; and at least one R is $-CH_2PO_3(X)_2$ and one X is hydrogen which is associated with a nitrogen atom by way of an intramolecular hydrogen bond between the nitrogen atom and an oxygen atom attached to a phosphorus atom;

compounds having the structural formula:

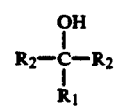

wherein:

$R_1$ is hydrogen or $-CH_3$;

$R_2$ is $-CH_2PO_3(X)_2$ $-CH_2NHCH_2PO_3(X)_2$;

X is hydrogen, an alkali metal cation, ammonium, a protonated amine or an alkaline earth metal cation in which case there is only one X per methylenephosphonate group; and when nitrogen is present, at least one X is hydrogen which is associated with the nitrogen atom by way of an intramolecular hydrogen bond between the nitrogen atom and an oxygen atom attached to a phosphorus atom; and mixtures of such compounds.

2. The composition of claim 1 wherein said set delaying agent is selected from the group consisting of aminotri(methylenephosphonic acid), ethylenediamine substituted with in the range of from 1 to 4 moles of methylenephosphonic acid, diethylenetriamine substituted with in the range of from 1 to 5 moles of methylenephosphonic acid, triethylenetetramine substituted with in the range of from 1 to 6 moles of methylenephosphonic acid and mixtures of such compounds.

3. A set delayed cement composition capable of being retained in a pumpable fluid state for a long time period and then caused to set by mixing a set activating agent therewith just prior to placement comprising:
   a hydraulic cement;
   sufficient water to form a pumpable slurry;
   a hydratable gel forming material selected from the group consisting of hydroxyalkylcellulose, carboxyalkylcellulose, carboxyalkylhydroxyalkylcellulose and mixtures thereof present in said composition in an amount in the range of from about 0.1% to about 1.0% by weight of dry cement therein; and
   a set delaying agent selected from the group consisting of aminotri(methylenephosphonic acid), ethylenediamine substituted with in the range of from 1 to 4 moles of methylenephosphonic acid, diethylenetriamine substituted with in the range of from 1 to 5 moles of methylenephosphonic acid, triethylenetetramine substituted with in the range of from 1 to 6 moles of methylenephosphonic acid, and mixtures of such compounds present in said composition in an amount in the range of from about 0.1% to about 2.5% by weight of dry cement therein.

4. The composition of claim 3 wherein said gel forming material is hydroxyethylcellulose present in said composition in an amount in the range of from about 0.1% to about 0.5% by weight of dry cement therein.

5. The composition of claim 4, wherein said set delaying agent is aminotri(methylenephosphonic acid) present in said composition in an amount in the range of from about 0.2% to about 0.7% by weight of dry cement therein.

6. The composition of claim 5 defined further to include a set activating agent selected from the group consisting of an aqueous sodium silicate solution, paraformaldehyde, calcium chloride and mixtures thereof.

7. A set delayed cement composition capable of being retained in a pumpable fluid state for a long time period and then caused to set by mixing a set activating agent therewith just prior to placement comprising:
   API Class H Portland cement;
   water in an amount in the range of from about 38% to about 46% by weight of dry cement;
   hydroxyethylcellulose in an amount in the range of from about 0.1% to about 0.5% by weight of dry cement therein; and
   aminotri(methylenephosphonic acid) present in an amount in the range of from about 0.2% to about 0.7% by weight of dry cement.

8. The composition of claim 7 wherein said aminotri(methylenephosphonic acid) is present in said composition in an amount of about 0.5% by weight of dry cement.

9. The composition of claim 8 defined further to include a set activating agent selected from the group consisting of an aqueous sodium silicate solution, paraformaldehyde, calcium chloride and mixtures thereof.

10. A method of cementing a zone at a remote location comprising the steps of:

preparing a set delayed cement composition comprised of hydraulic cement, sufficient water to form a pumpable slurry, a hydratable gel forming material selected from the group consisting of hydratable cellulose derivatives, polyvinyl alcohol, and polymers of 2-acrylamido-2-methylpropane sulfonic acid, sodium vinylsulfonate, acrylamide, N,N-dimethylacrylamide, acrylic acid, and mixtures of the foregoing compounds present in said slurry in an amount in the range of from about 0.01% to about 1.5% by weight of dry cement to minimize the settling of solids and separation of free water therefrom, and a set delaying agent comprised of a methylene-phosphonic acid derivative present in said slurry in an amount in the range of from about 0.1% to about 5.0% by weight of dry cement therein, said methylenephosphonic acid derivative being selected from the group consisting of compounds having the general formula:

$$R_1-N-R_3 \atop |\atop R_2$$

wherein:
$R_1$, $R_2$ and $R_3$ are independently hydrogen, $-CH_2PO_3(X)_2$ or $-CH_2CH_2-O-PO_3(X)_2$ with the limitation that one of $R_1$, $R_2$ and $R_3$ is always $-CH_2PO_3(X)_2$ or $-CH_2CH_2-O-PO_3(X)_2$;
X is hydrogen, an alkali metal cation, ammonium, a protonated amine or an alkaline earth metal cation in which case there is only one X per methylenephosphonate group; and
at least one X is hydrogen which is associated with the nitrogen atom by way of an intramolecular hydrogen bond between the nitrogen atom and an oxygen atom attached to a phosphorus atom; compounds having the structural formula:

$$R_2\!\!\diagdown\!\!\phantom{x}\phantom{x}\phantom{x}\phantom{x}\phantom{x}\phantom{x}\phantom{x}\phantom{x}\phantom{x}\phantom{x}\diagup\!\!R_2 \atop N-CH_2(CH_2-N-CH_2)_n-CH_2-N \atop R_2\!\!\diagup\phantom{xxxxxxxx}|\phantom{xxxxxxxx}\diagdown\!\!R_2 \atop \phantom{xxxxxxxxxx}R_1$$

wherein:
n is an integer from 1 to 4;
$R_1$ is hydrogen or $-CH_2PO_3(X)_2$;
$R_2$ is hydrogen, $-CH_2PO_3(X)_2$ or $-CH_2CH_2N(R_3)_2$ wherein $R_3$ is hydrogen or $-CH_2PO_3(X)_2$;
X is hydrogen, an alkali metal cation, ammonium, a protonated amine or an alkaline earth metal cation in which case there is only one X per methylenephosphonate group; and
at least one of $R_1$, $R_2$ or $R_3$ is $-CH_2PO_3(X)_2$ and one X is hydrogen which is associated with a nitrogen atom by way of an intramolecular hydrogen bond between the nitrogen atom and an oxygen atom attached to a phosphorus atom; compounds having the structural formula:

$$R_2-N\phantom{xx}N-CH_2-(CH_2-N-CH_2)_n-CH_2-R_3 \atop \phantom{xxxxxxxxxxxxxxxxxxxx}|\atop\phantom{xxxxxxxxxxxxxxxxxxx}R_1$$

wherein:

n is an integer from 0 to 4;

$R_1$ is hydrogen or $-CH_2PO_3(X)_2$;

$R_2$ is hydrogen, $-CH_2PO_3(X)_2$ or $-CH_2CH_2N(R_4)_2$ wherein $R_4$ is hydrogen or $-CH_2PO_3(X)_2$;

$R_3$ is $-N(R_5)_2$ or

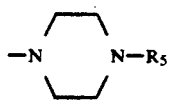

wherein $R_5$ is hydrogen or $-CH_2PO_3(X)_2$;

X is hydrogen, an alkali metal cation, ammonium, a protonated amine or an alkaline earth metal cation in which case there is only one X per methylenephosphonate group; and at least one of $R_1$, $R_2$ or $R_3$ is $-CH_2PO_3(X)_2$ and one X is hydrogen which is associated with a nitrogen atom by way of an intramolecular hydrogen bond between the nitrogen atom and an oxygen atom attached to a phosphorus atom;

compounds having the structural formula:

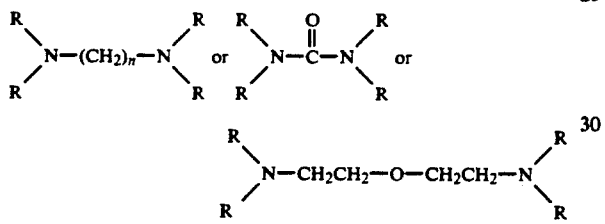

wherein:

n is an integer from 2 to 6;

R is hydrogen, $-CH_2PO_3(X)_2$ or $-CH_2CH_2N(R_1)_2$ wherein $R_1$ is hydrogen or $-CH_2PO_3(X)_2$;

X is hydrogen, an alkali metal cation, ammonium, a protonated amine or an alkaline earth metal cation in which case there is only one X per methylenephosphonate group; and at least one R is $-CH_2PO_3(X)_2$ and one X is hydrogen which is associated with a nitrogen atom by way of an intramolecular hydrogen bond between the nitrogen atom and an oxygen atom attached to a phosphorus atom;

compounds having the structural formula:

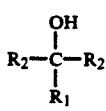

wherein:

$R_1$ is hydrogen or $-CH_3$;

$R_2$ is $-CH_2PO_3(X)_2$ $-CH_2NHCH_2PO_3(X)_2$;

X is hydrogen, an alkali metal cation, ammonium, a protonated amine or an alkaline earth metal cation in which case there is only one X per methylenephosphonate group; and when nitrogen is present, at leat one X is hydrogen which is associated with the nitrogen atom by way of an intramolecular hydrogen bond between the nitrogen atom and an oxygen atom attached to a phosphorus atom, and mixtures of each compounds;

transporting said set delayed cement composition to said remote location;

mixing a set activating agent with said cement composition just prior to the placement thereof selected from the group consisting of an aqueous sodium silicate solution, paraformaldehyde, calcium chloride and mixtures thereof; and placing the resulting mixture in said zone.

11. The method of claim 10 wherein said set activating agent is mixed with said set delayed cement composition in an amount in the range of from about 0.5% to about 2.5% by weight of said cement composition.

12. The method of claim 10 which is further characterized to include the step of storing said set delayed cement composition at said remote location.

13. A method of cementing a zone at a remote location comprising the steps of:

preparing a set delayed cement composition comprising a hydraulic cement, sufficient water to form a pumpable slurry, a hydratable gel forming material selected from the group consisting of hydroxyalkylcellulose, carboxyalkylcellulose and carboxyalkylhydroxyalkyl cellulose, present in said composition in an amount in the range of from about 0.1% to about 1.0% by weight of dry cement therein, and a set delaying agent selected from the group consisting of aminotri(methylenephosphonic acid), ethylenediamine substituted with in the range of from 1 to 4 moles of methylenephosphonic acid, diethylenetriamine substituted with in the range of from 1 to 5 moles of methylenephosphonic acid, triethylenetetramine substituted with in the range of from 1 to 6 moles of methylenephosphonic acid, and mixtures thereof present in said composition in an amount in the range of from about 0.1% to about 2.5% by weight of dry cement therein;

transporting said set delayed cement composition to said remote location;

mixing a set activating agent selected from an aqueous sodium silicate solution, paraformaldehyde, calcium chloride, and mixtures thereof with said cement composition just prior to the placement thereof; and placing said composition in said zone.

14. The method of claim 13 wherein said hydratable gel forming material is hydroxyethylcellulose present in said composition in an amount in the range of from about 0.1% to about 0.5% by weight of dry cement therein.

15. The method of claim 13 wherein said set delaying agent is aminotri(methylenephosphonic acid) present in said composition in an amount in the range of from about 0.2% to about 0.7% by weight of dry cement therein.

16. The method of claim 12 wherein said set activating agent is selected from the group consisting of an aqueous sodium silicate solution, paraformaldehyde, calcium chloride and mixtures thereof and is mixed with said cement composition in an amount in the range of from about 0.5% to about 2.5% by weight of said cement composition.

17. A method of cementing a zone at a remote location comprising the steps of:

preparing a set delayed cement composition comprising API Class H Portland cement, water in an amount in the range of from about 38% to about 46% by weight of dry cement, hydroxyethylcellulose in an amount in the range of from about 0.1% to about 0.5% by weight of dry cement, and aminotri(methylenephosphonic acid) present in said composition an amount in the range of from about 0.2% to about 0.7% by weight of dry cement;

transporting said set delayed cement composition to said remote location;

storing said set delayed cement composition at said remote location;

mixing a set activating agent selected from the group consisting of an aqueous sodium silicate solution, paraformaldehyde, calcium chloride and mixtures thereof with said cement composition just prior to the placement thereof in said zone; and placing the resulting mixture in said zone.

18. The method of claim 17 wherein said hydroxyethylcellulose is present in said composition in an amount of about 0.2% by weight of dry cement therein, said set delaying agent is present in said composition in an amount of about 0.5% by weight of dry cement therein, and said set activating agent is selected from the group consisting of paraformaldehyde, calcium chloride, and mixtures thereof and is mixed with said cement composition in an amount of about 1.0% by weight of said cement composition.

* * * * *

UNITED STATES PATENT AND TRADEMARK OFFICE
CERTIFICATE OF CORRECTION

PATENT NO. : 4,676,832

DATED : June 30, 1987

INVENTOR(S) : Jerry D. Childs, David L. Sutton and Freddie L. Sabins

It is certified that error appears in the above-identified patent and that said Letters Patent is hereby corrected as shown below:

In column 2, line 64, the word "on" should read -- one -- and the word "methylen" should read -- methylene --.

In column 22, line 1, the word "each" should read -- such --.

Signed and Sealed this

Twenty-fourth Day of November, 1987

Attest:

DONALD J. QUIGG

Attesting Officer

Commissioner of Patents and Trademarks